United States Patent Office 3,714,390
Patented Jan. 30, 1973

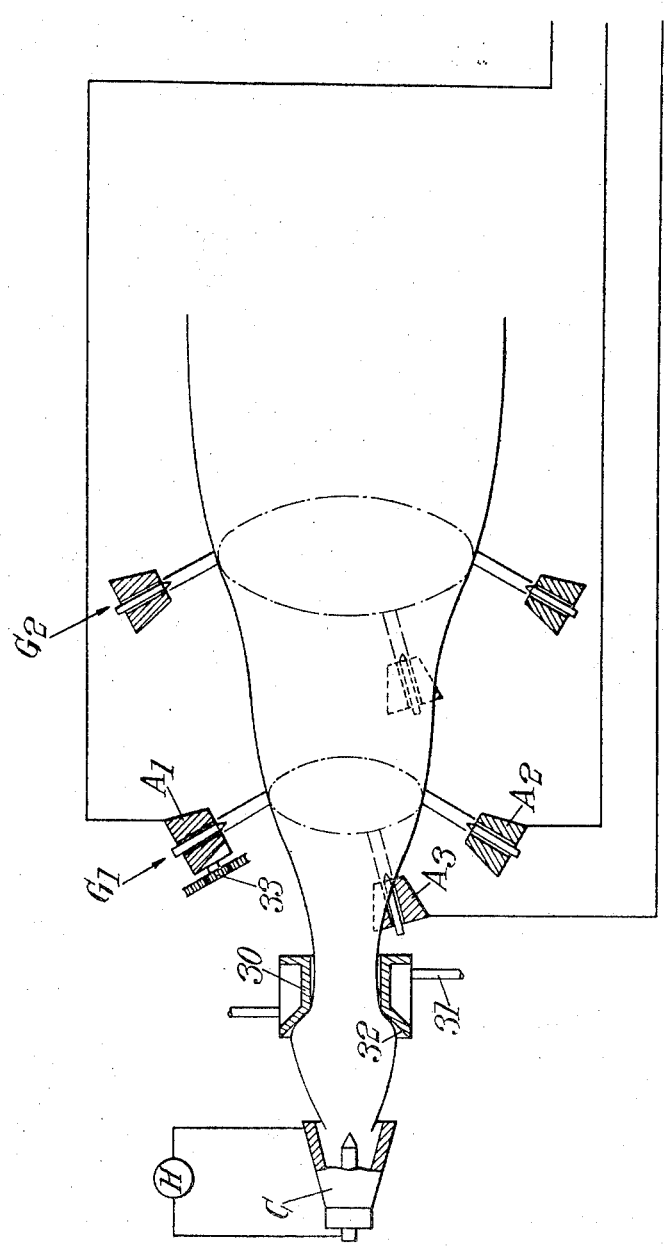

3,714,390
PROCESSES FOR PRODUCING PLASMA STREAMS WITHIN FLOWS OF FLUIDS
Marc Foex, Paris, and Robert Delmas and Claude Bonet, Montlouis, France, assignors to Agence Nationale de Valorisation de la Recherche (ANVAR), Pateaux, France
Filed Dec. 29, 1969, Ser. No. 888,508
Claims priority, application France, Dec. 31, 1968, 182,839
Int. Cl. B23k 9/00
U.S. Cl. 219—121 P
13 Claims

ABSTRACT OF THE DISCLOSURE

A process for producing plasmas which comprises nozzles delivering flows of fluid positioned such that said flows contact each other and electrodes respectively in contact with said flows. The electrodes are included in an electric circuit which is normally open and includes an external electric current supply source, the corresponding nozzle electrode for at least one of the flows being without an independent electrical supply. By sufficiently reducing the electric resistance within said flows and between the corresponding electrodes the electric circuit may be completed through said flows with the occurrence of electric arcs therein. This reduction of the resistance is preferably obtained by ionizing the atmosphere in which the flows are formed.

---

The invention relates to processes and apparatuses for producing plasma streams within flows of fluids.

Installations have already been disclosed wherein at least two generators of ionized gases are positioned such that the elementary plasma flows delivered by said generators converge substantially with one another and wherein these generators are connected to an exterior electric current supplying source such that an electric heating current is caused to travel along a path passing through the converging zone of these flows, whereby the energy supplied by said exterior electric current source is recovered within said elementary flows and the permanent flow resulting from the convergence of the former.

Although the independent electrical supply of one or several of the generators may be reduced, and even eliminated under certain conditions, such as when the exterior electrical current supply source provides direct current, and when the heating electric current has been initiated within the elementary flows, the energy which may be recovered remains however dependent up on the flows of fluid likely to be delivered by said generators, which flows remain themselves practically dependent upon the characteristics of operation of the corresponding generators.

An object of the invention is to modify these installations such that they are better adapted than heretofore to the different operational requirements and, especially to provide processes and installations of a considerably simpler nature than those known heretofore and which are able to produce plasmas streams within flows of fluids of any nature (pure gases, gaseous mixtures, vapors, liquids or liquid solutions, aerosols, broths, foams, emulsions and suspensions) under any flow rate.

The invention is based on the discovery that advantage may be taken of the difference in electric conductivity which exists between the gases contained within a plasma flow and the surrounding atmosphere, even if the latter is less dielectric than the above gases in their cold state, for forming in said flow a preferential path for an electric current.

The process according to the invention comprises producing at least one elementary flow of fluid by means of a first nozzle including an ejection channel and an electrode disposed substantially along the longitudinal axis of said ejection channel and having a front extremity which extends to a plane at least flush with respect to the end of said ejection channel, said elementary flow being caused to flow within said ejection channel around said electrode; causing said elementary flow to converge with at least one other fluid flow produced by a second nozzle so as to produce a principal flow resulting from the convergence of said elementary flow and said other fluid flow; connecting said electrode and said second nozzle in a normally open electrical circuit including an external voltage source which produces a voltage sufficient to cause completion of said circuit through said elementary flow and said other fluid flow when the electrical resistance therein is reduced; producing a plasma flow having a cross section greater than that of said elementary flow and said other fluid flow for ionizing the atmosphere in which said elementary flow and said other fluid flow are formed to thereby cause a reduction of the electrical resistance in, and an ionization of, said elementary flow and said other fluid flow; and maintaining the production of said plasma flow at least until up to the time when said electrical circuit is completed through the ionized elementary flow and other fluid flow.

Other provisions or features of the invention will become apparent as the description thereof proceeds in connection with preferred embodiments with reference to the drawings in which:

FIGS. 7 to 13, are diagrammatic representations of installations according to additional embodiments of the invention.

The invention will be disclosed hereafter, as applied to the production of plasmas streams within gaseous flows, it being however understood that the invention could also be applied to other fluids, in particular to those referred to above The process according to the invention comprises causing at least two gaseous flows P and E, of which at least one is supplied through a nozzle A associated with an electrode maintained in contact with the corresponding flow (E in FIG. 1), to converge with another, said electrode being provided within an electric circuit 2 including an external electric current supply source referred to hereafter as principal generator G, and producing in these flows, outside of said nozzle, a reduction of the electric resistance within said flows such that said electric circuit 2 may be completed through said flows. The electrodes associated with the above nozzles may be constituted by conducting parts of the nozzles themselves (FIGS. 1, 2, 4, 7 and 9) or, in the contrary, consist of distinct elements 1c as it will become apparent in embodiments of the invention which will be described later (other figures).

In a first group of preferred embodiments of the invention, one of the flows, for instance flow P, is supplied by a plasma blowpipe C, referred to hereafter under "pilot blowpipe," of which at least one electrode (anode 3 or cathode 4) is itself provided within circuit 2

Figure 2:
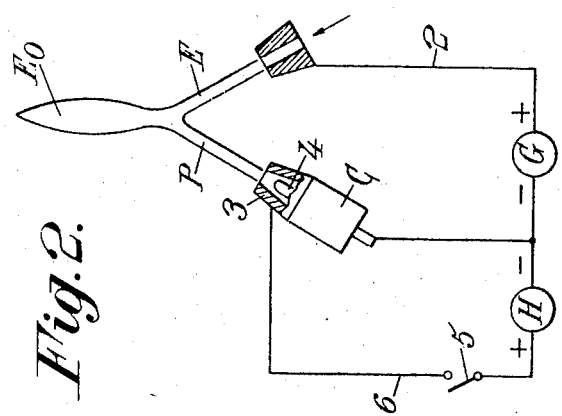

The independent supply source H of the pilot blowpipe may be itself provided within or separate from circuit 2 (in particular when the switch 5 provided within the supply circuit 6 of the pilot blowpipe C in FIG 2 is opened).

As indicated hereabove, a preferential path may be formed for an arc in flow E, even if its electric conductivity before ignition of an electric arc therein, is lower than that of the surrounding atmosphere, subject however of this arc originating in a zone of the nozzle in contact with the gas of the flow The ignition of the arc, which produces a heating of the above mentioned zone of the nozzle, will also produce a heating of the gas in the flow, and hence a reduction of its resistivity, thereby forming a path of less resistance than the surrounding atmosphere for electric current. Obviously the intensity of this phenomenon will be even greater if the gas in the flow is itself, at rest, less dielectric than the surrounding atmosphere.

Figure 1:
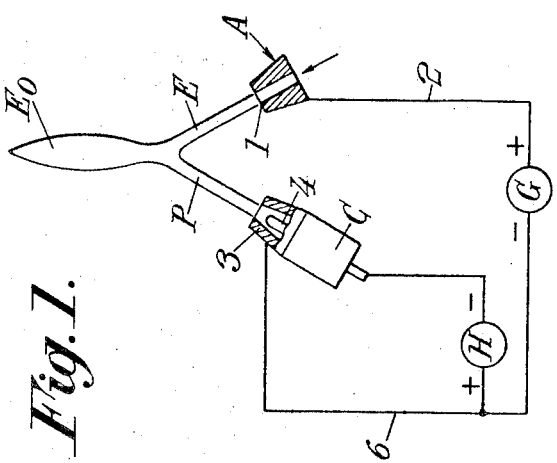

As a result, especially in the installations shown in FIGS. 1 and 2, it will be sufficient to initiate an arc along flow E between nozzle A and flow P, since the latter is already itself ionized, for completing the above mentioned circuit 2.

It has been found that the ignition may be performed in many fashions, for instance by resorting to the conventional methods used for causing the ignition of a plasma blowpipe, these methods, when applied to the nozzles, consisting for instance to produce electric discharges along the gaseous stream delivered by the nozzle or producing a temporary electric connection between nozzle A and flow P for instance by means of a rod of graphite or an analogous material. This ignition may also, especially when nozzle A and blowpipe C are movable, be produced by bringing them closer together such that the voltage available at the terminals of the principal generator G will itself be able to produce the ionization of the gaseous flows delivered by the nozzle; in such instance their ionization will be favoured by the peak effect or corona effect produced when the electrodes exhibit the forms shown in FIGS. 5 or 6. The ignition may also be performed by introducing in the flow delivered by the nozzle ionizable substances, for instance alkaline halides or metallic oxides, or by ionizing the whole ambient medium as will be disclosed more particularly in connection with FIGS. 10 and 11 hereafter.

Figure 4:
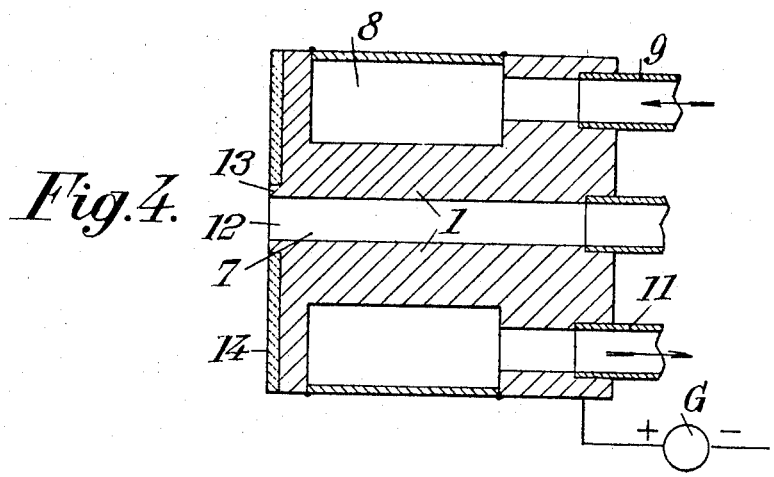
FIGS. 4 to 6 are axial sections of nozzles likely to be used in such installations, according to preferred embodiments of the invention.

When generator G delivers direct current and its positive terminal (FIGS. 1 and 2) is connected to nozzle A, the same may be constituted by a mere metallic nozzle, for instance such as shown in greater detail in FIG. 4, which nozzle comprises an ejection channel 7 for the gases, surrounded by a cooling chamber 8 connected to an inlet 9 for a refrigerating fluid and to an outlet 11 for the removal of this fluid, after the same has travelled through chamber 8. The conducting part 1 consists advantageously only of an annular narrow part 13 surrounding the gas outlet 12 of the nozzle, whereby a satisfactory centering of the arc formed in the gaseous flow is obtained.

In that respect, the exterior side of the nozzle, around that annular part 13, is advantageously covered with an electric insulator 14 which, in addition, prevents the formation of parasitic arcs during the operation of the installation.

Such a nozzle, even though it has no independent electric current supply system, is then able to operate like a true plasma blowpipe as soon as an arc has been ignited between nozzle A and the pilot ionized flow P, along flow E in the conditions set forth hereabove.

The completion of circuit 2 through flows P and E then authorizes the reduction and even the interruption of the current delivered by generator H. In the installation shown in FIG. 1, the electric current within circuit 2 may travel either through the cathode or through the cathode and anode, and further through generator H when the same is positioned within the circuit, generator H then acting like a mere resistance. It has however been found that in the installation of FIG. 1, the electric current travels preferentially through cathode 4 of blowpipe C so that the negative terminal of generator G may also be directly connected to cathode 4 of blowpipe C (FIG. 2). Generator H may also be disconnected from circuit 2, such as by the opening of a switch 5 provided within the corresponding part of the independent electric current supply circuit of the pilot blowpipe (FIG. 2).

There is thus provided an installation in which plasmas may be produced in gaseous flows delivered by mere nozzles, whereby the flow rates of these flows may be controlled responsive to parameters different from those taken in account in former systems, more particularly the operation characteristics of each of the sources which delivered these flows.

It is possible in the installation according to the invention to produce plasma streams within the gaseous flows delivered by the nozzles under rates either much smaller or, in the contrary, much higher than the usual supply rates of the conventional blowpipes, depending on whether it is desired to obtain laminar plasma flows $E_0$ or resulting flows exhibiting a high power and a high temperature.

Moreover, the installations according to the invention enable the easy production of plasma streams within flows of corrosive or oxiding gases, such as oxygen, which have no effect on the above mentioned nozzles, especially in the installations shown in FIGS. 1 and 2.

By way of example only, and for the mere purpose of illustrating the invention, the results obtained with an installation according to FIG. 1 will be set forth herebelow; more particularly these results were obtained under the following experimental conditions:

rate of the nitrogen flow delivered by the pilot blowpipe C: 7 l./minute;
rate of the argon flow delivered by nozzle A: 7 l./minute;
angle formed between the axes of blowpipe C and of nozzle A: 90°;
distance between the outlet of pilot blowpipe C and the point of convergence of flows $E_1$, $E_2$: 13 cm.;
distance of the outlet of the nozzle A from the same point: 5 cm.

The energy supplied during the operation of the installation by generator G and generator H, especially when the latter is maintained under operation, are respectively set forth in the two first columns starting from the left in Table I herebelow. The measured amount of energy (yield) which has been dissipated in flows P, E and in the flow $E_0$ resulting from their convergence, has been set forth in the column on the right side of Table I.

TABLE I

| Energy supplied by H (kw.) | Energy supplied by G (kw.) | Yield, percent |
|---|---|---|
| 15 (60 v.-250 a.) | 30 (130 v.-250 a.) | 78 |
| 15 (60 v.-250 a.) | 38 (160 v.-240 a.) | 81 |
| 0 | 45 (185 v.-240 a.) | >90 |

The comparison of the yields set forth in the first and third horizontal lines of the table, which corresponds to results of experimentations which involved the use of equal total energies, shows that the interruption of the independent electrical current supply of pilot blowpipe C causes an important increase of the energetic yield of the installation. The results set forth in Table II herebelow were obtained when supplying the same nozzle A with oxygen and when the respective distances of the pilot blowpipe C and of the nozzle A from the point of convergence were equal to 7 and 5 cm., the other conditions of operation of the installation having been the same than indicated hereabove.

TABLE II

| Energy supplied by H (kw.) | Energy supplied by G (kw.) | Yield, percent |
|---|---|---|
| 15 (60 v.-250 a.) | 60 (200 v.-300 a.) | 80 |
| 15 (60 v.-250 a.) | 44 (200 v.-220 a.) | 75 |
| 0 | 48 (230 v.-210 a.) | 90 |

Figure 3:
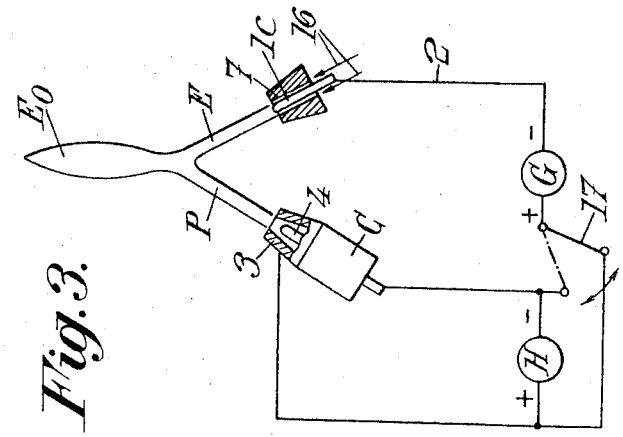
FIGS. 1 and 3 are diagrammatic representations of installations according to various embodiments of the invention, for producing plasma streams within gaseous flows.

In the installations described hereabove, the conducting part 1 of nozzle A was connected to the positive terminal of generator G. It may also be connected to the negative terminal of generator G as shown in FIG. 3, or to one of the terminals of a source of mono- or polyphase alternating current, this conducting part behaving accordingly like a cathode, either continuously or periodically.

After ignition of the arc in the flows P and E and the possible disconnection of generator H, one of the electrodes, for instance the anode 3 (FIG. 2) of the pilot blowpipe may also be disconnected by means of a switch 5 provided in circuit 2, so that only the cathode 4 of the pilot blowpipe participates to the passage of the electric current used in the formation of the plasma in the flows P and E.

Obviously one could have resorted to the reverse provision, i.e. to the disconnection of the sole cathode of the pilot blowpipe. The two electrodes 3 and 4 of blowpipe C could also be short-circuited.

Figure 5:
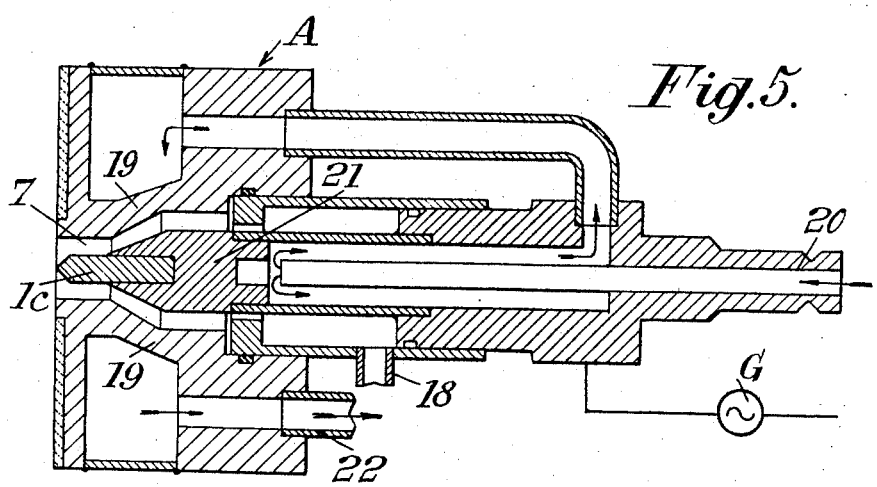

The greater the ability of the material constituting the conducting part of nozzle A to emit electrons or ionized particles, the better also its ability to act as a cathode continuously (when generator G delivers direct current) or periodically (when generator G delivers an alternating or a polyphased current). It consists advantageously of tungsten. More particularly it is advantageous to resort to nozzles devised as shown in FIGS. 5 and 6, wherein the conducting part $1c$ which acts as the cathode is provided within the ejection channel 7, the gases supplied to nozzle A entering into the same through inlet 18 and flowing within the ejection channel around part $1c$.

In preferred embodiments of this last type of nozzle, the cathodic part $1c$ is flush with the frontal surface of the nozzle (FIG. 5) or protrudes with respect thereto (FIG. 6) thereby providing for both a good heating and a good contact of this cathodic part with the ionized portion of the gaseous flow delivered by the nozzle.

The parts of the nozzle surrounding the ejection channel 7 may then consist of a material which has conducting properties and which is brought to the same potential than the cathode $1c$ (FIG. 5) or of a refractory insulating material. In this last instance, the conducting part is alone connected to the principal generator G.

Figure 6:
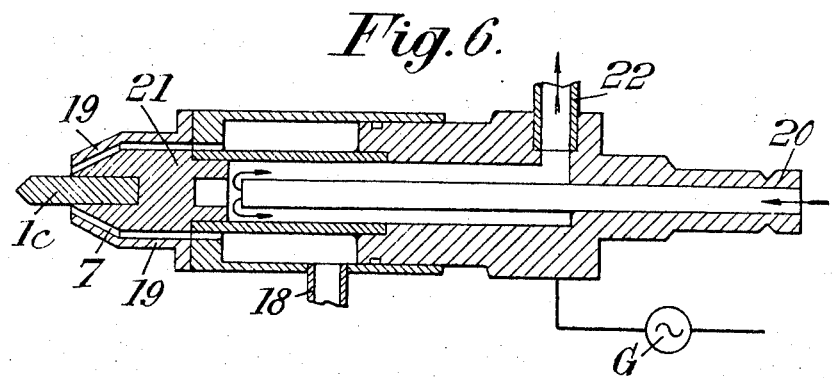
Figure 7:
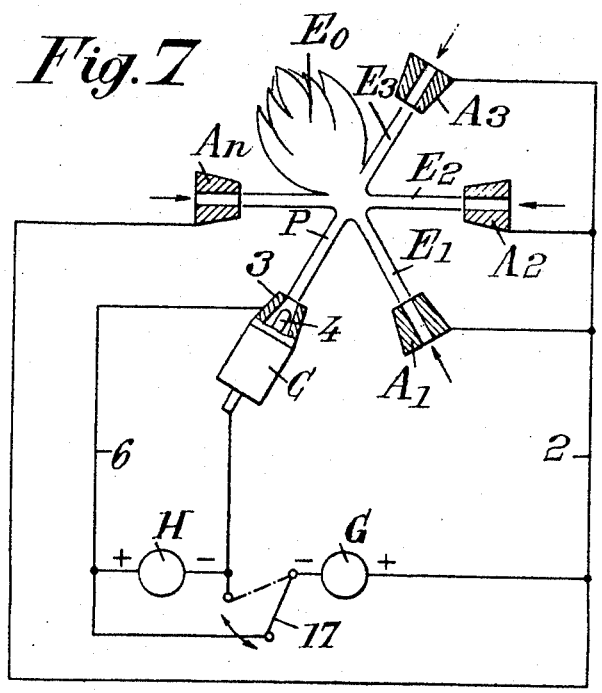

Such nozzles may then also be provided with cooling means, with an inlet 20 for a cooling fluid along a path shown by arrows in FIGS. 6 and 7 for cooling the cathode support 21 and, if need be (FIG. 5), the parts 19 of the nozzle which surround ejection channel 7 prior to leaving the nozzle through an inlet 22. The cooling may also be performed with the plasma forming fluid, if the same is supplied to the nozzle under a rate sufficient to that effect.

The pilot blowpipe C may cooperate not only with one single nozzle, like in the installations which have been discussed, but with a plurality of such nozzles $A_1$, $A_2$, $A_3$ ... $A_n$, positioned such that the gaseous flows delivered by them intercept the plasma flow P produced by the pilot blowpipe, the generator G then being designed to be able to produce the simultaneous or successive ignition of the electric arcs in the $n$ flows delivered by the $n$ nozzles.

In the installation shown in FIG. 7, these $n$ nozzles are connected to the positive terminal of the common supply generator G. Obviously the polarities of the nozzles could be reversed, in which instance however it would be advantageous to provide these nozzles with emissive cathodes $1c$ of the type described in connection with FIGS. 5 and 6.

Figure 8:
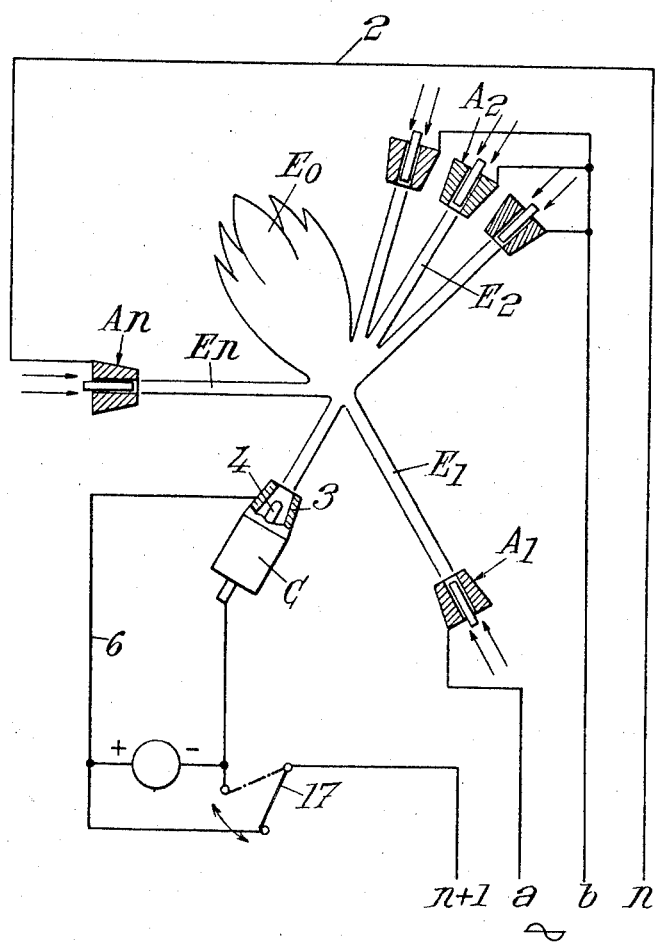

In another embodiment of this last type of installation, shown in FIG. 8, nozzles $A_1$, $A_2$ ... $A_n$ are respectively connected to $n$ distinct phases $a, b \ldots n$ of a polyphase alternating supply source comprising a $n+1^{th}$ phase connected to one of the electrodes of the pilot blowpipe C, either to the anode or to the cathode, depending upon the position of the switch 17 provided between the generators G and H. When the alternating polyphased current has been ignited in flows P, $E_1$, $E_2$ ... $E_n$ in the presence of the plasma P delivered by the pilot blowpipe, after the energization generator G and, when needed, by the reduction of the resistance within each of these flows by the means referred to above, the electric supply of the blowpipe C may be disconnected, the electric arc then being maintained by the sole polyphased current supply.

Each of the phases of the polyphased current supply may be connected to more than one nozzle (as represented for the phase $b$ of the polyphased supply in FIG. 8), provided that the streams delivered by these nozzles converge with one another.

Figure 9:
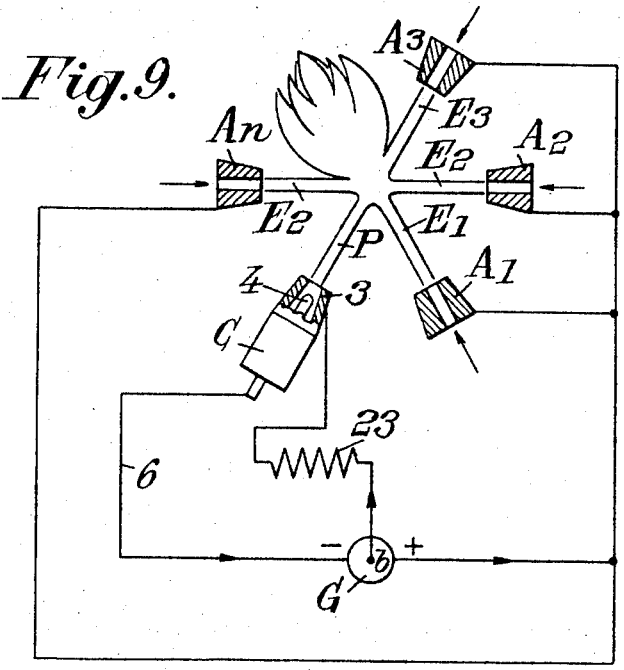

In an additional embodiment of the invention shown in FIG. 9, generators G and H are merged into a single generator G which comprises a negative terminal connected for instance to the cathode 4 of the pilot blowpipe C, a positive terminal connected to the nozzles $A_1$, $A_2$ ... $A_n$, and finally a terminal $b$ at an intermediate potential connected to anode 3 of the pilot blowpipe through a resistance 23. Assuming $I_0$ is the current intensity delivered by generator G in the sole supply circuit 6 of the pilot blowpipe, before ignition of the arcs within the flows $E_1$, $E_2$ ... $E_n$, it will be appreciated that this intensity $I_0$ divides, after ignition, between an intensity $I_1$ for the upkeep of the pilot plasma P and an intensity $I_2$ for the upkeep of $n$ plasma streams formed within the flows delivered by the nozzles.

The value of the resistance 23 is advantageously chosen such that the value of intensity $I_1$ be small as compared to the value of intensity $I_2$. However if for some reason the electric circuit formed within the plasma stream P and the $n$ flows delivered by the nozzles tends to be cut off, $I_1$ will tend to equal its original value $I_0$ and accordingly will permit the reigniting of the electric current in the $n$ flows, this reignition being then followed by the concomitant decrease of the intensity of the supply current of the pilot blowpipe to the value $I_1$.

Obviously the connections could be reversed; the conducting parts of the nozzles $A_1$, $A_2$ ... $A_n$ should then preferably be devised as described previously in connection with FIGS. 5 and 6.

According to a further embodiment of these installations, the supply circuit 2 of nozzles $A_1$, $A_2$ ... is distinct from the supply circuit 6 of the pilot blowpipe, the latter then merely producing an ionization of the atmosphere in which the converging gaseous stream $E_1$, $E_2$ ... delivered by the nozzles are caused to flow, this ionization being sufficient to favor more easy completion of circuit 2 through said streams.

Figure 10:
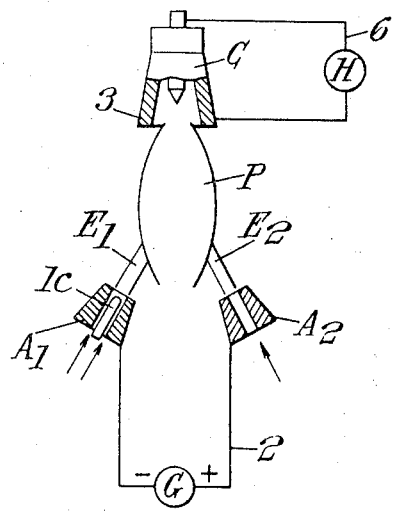
Figure 11:
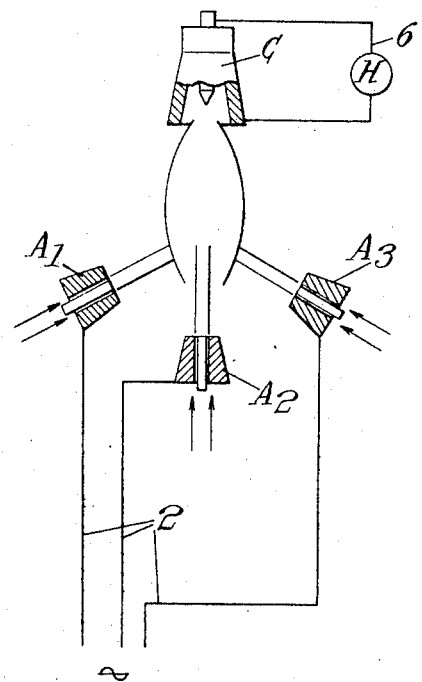

Such embodiments are shown in FIGS. 10 and 11. In the installation of FIG. 10, generator G delivers direct current. If it were to deliver alternating current the nozzles $A_1$, $A_2$ shown to FIG. 10 should preferably be both provided with emitting central parts $1c$. In the installation of FIG. 11, the nozzles are respectively connected to the phases of a polyphased current supply source.

When the arcs have been established in the converging flows (irrespective of whether the current is direct, mono- or polyphased) the independent electric supply of the pilot blowpipe may be disconnected, so that plasma streams are finally obtained within flows all delivered by mere nozzles, all of which are devoid of any particular current supply.

This can be achieved for instance with two or three nozzles positioned such that the point of convergence of their axes is at a 5 cm. distance of their frontal surfaces respectively, when these nozzles are supplied with argon under flow rates varying from 1 to 100 l./minute and when they are respectively connected to a monophased electrical current supply or to a triphased electrical current supply under 380 v. and 50 Hz.

The pilot blowpipe was supplied with nitrogen under a flow rate of 7 l./minute and with electric current under 60 v. and 250 a., the frontal face of the pilot blowpipe being at a 10 cm. distance from the above point of convergence.

After the disconnection of the pilot blowpipe, the following values for the voltage across and intensity of the current travelling between the nozzles were measured:

Voltage _____ 100 v. R.M.S.
Intensity _____ 280 a. R.M.S.

Accordingly a triphased alternating useful energy of 48.5 kw. was recovered in the gaseous flows, thus with an energetic yield higher than 95%.

It will be appreciated that in all the installations which can be devised, electric arcs can be formed in the flows delivered by the different nozzles, including the pilot blowpipe, by merely bringing them sufficiently close to one another; it should be noted that the flow need not be in all instances rigorously convergent; for instance it is sufficient to cause them to be tangent with respect to one another to obtain the completion of the arc through these flows.

The characteristics of operation of the installations concerned will be further improved when resorting to another feature of the invention which consists in imparting to the anode 3 of the pilot blowpipe C a form diverging in the direction of emission of the corresponding plasma flow P (FIGS. 10 and 11).

A plasma flow having a greater section and a smaller resistivity, hence a flow having improved electrical conducting properties, is obtained with a pilot blowpipe using such a particular anode 3. Moreover, it facilitates the production of the contact of the flows delivered by the pilot blowpipe and by the other nozzles with each other, hence the ignition of electric arcs in these flows.

This particular construction of the anode is of particular value when it is desired to ionize a relatively large volume of the atmosphere, in particular for favouring the ignition of electric arcs in the flows delivered by nozzles arranged and cooperating as shown in FIGS. 10 and 11.

This construction of the anode 3 also favors the upkeep of the electric current within the gaseous flows under the sole action of the principal generator G, particularly when generator H has been disconnected.

The results obtained in such an installation will further be improved if it further comprises, in addition to the diverging anode disclosed hereabove, an annular member 30 (FIG. 12) refrigerated by a water current supplied to this member through a duct system, part of which has been diagrammed at 31, said annular member 30 further comprising a conical surface 32 widening out toward the pilot blowpipe and whose axis coincides with that of the pilot blowpipe.

The annular member 32 may then perform one or several of the following functions:

(1) centering and shaping of the pilot plasma flow,
(2) forming the principal anode of the pilot blowpipe (when the former is electrically connected to the latter); the internal anode of the pilot blowpipe which provided ignition of the arc thereof may then be disconnected; a pilot flow of increased power may thus be obtained thanks to the possible increase in voltage;
(3) stabilizing the operation under pressure of the pilot blowpipe, when this member is used as the principal anode (for instance when the whole installation operates under an external atmosphere maintained under pressures varying for instance from 1 to 20 bars).

This combination of a pilot blowpipe with diverging anode and of said annular member 30 is used with advantage in installations for the production of plasmas of large volume and high energy, for instance of the type disclosed in FIG. 12. Such installation comprises at least one group, referred to generally under $G_1$ in FIG. 12, of nozzles $A_1$, $A_2$, $A_3$ cooperating with copper electrodes refrigerated by water and supplied for instance with nitrogen (or any other fluid). The electrodes are respectively connected to the phases of a triphased electric current source, each of these nozzle-electrode assemblies being able to slide along its axis (as diagrammatically represented for one of them by a rack and pinion system 33), the axes of the three nozzle-electrode assemblies being contained in three planes passing through the axis of the pilot blowpipe, on the one hand, and making respectively an angle of 60° with the axis of the pilot blowpipe, on the other hand.

This installation can then be operated as follows: the pilot blowpipe is first operated; the flow rate of the plasma forming gas and the electric supply of the pilot blowpipe are controlled to produce the necessary ionization of the space between the electrodes associated with the nozzles $A_1$, $A_2$, $A_3$, upstream from the annular centering member 30. Arcs are thus ignited between the nozzle-electrode assemblies $A_1$, $A_2$, $A_3$ and the triphased alternating current flows through the electrodes along the gaseous flows delivered by the corresponding nozzles. The interelectrode distance may then be varied in large proportions, by moving the nozzle-electrode assemblies along their axes. It will be appreciated that the greater the interelectrode distance between the nozzle-electrode assemblies $A_1$, $A_2$, $A_3$, the higher the difference of potential that may be applied between them and accordingly the higher the energy recovered in the resulting flows. The supply of electric current to the pilot blowpipe may be disconnected, and the flow rates delivered by the different nozzles varied to a large extent.

The results obtained with such an installation (with only one group $G_1$ of three nozzle-electrode assemblies) are tabulated below.

TABLE III

| | | | | | |
|---|---|---|---|---|---|
| Interelectrode distance ($d_{mm}$) | 30 | 40 | 60 | 100 | 120 |
| V. (volts) interelectrode tension | 90 | 100 | 140 | 200 | 220 |
| I Intensity in each phase | 160 | 160 | 180 | 200 | 200 |
| P (kw.) | 24.5 | 27 | 43.6 | 69.7 | 76.1 |

The pilot blowpipe was operated at the time of ignition under 60 v., 400 a., and under a nitrogen flow rate of 20 l./minute.

The nitrogen flow rate delivered by each of the nozzle-electrode assemblies $A_1$, $A_2$, $A_3$, was of 30 l./minute; the interelectrode distances in the first horizontal row of the Table III were taken between the tips of the corresponding electrodes; it will of course be appreciated that the actual length of the path travelled by the electric current from one electrode to the other was longer since it passed through the point of convergence of the three plasma flows.

The total energy yield of the installation was of 90%.

This installation may be completed with additional groups of nozzle-electrode assemblies, for instance with one or several triphased groups (only one additional group $G_2$ being shown in FIG. 12), each of these groups comprising for instance three identical nozzle-electrode assemblies in the same angular positions as those of the group $G_1$. The flows delivered by each of those groups converged substantially with one another at a point located on the axis of the pilot blowpipe. Each group is associated with an independent electric current supply source.

This installation can thus be operated as follows: the pilot blowpipe ionizes the interelectrode space of the first group and causes the ignition of electric arcs in the flows delivered by the corresponding nozzles. The pilot blowpipe C may then be electrically disconnected.

The first group $G_1$ (whether the blowpipe C is electrically disconnected or not) is then able itself to act as a pilot blowpipe for favoring the ignition of electric arcs in the flows delivered by the nozzles of group $G_2$. The electrodes of group $G_1$ may then be electrically disconnected. $G_2$ could in turn act as a pilot for an additional group $G_3$ (not represented) etc.

Since the energy recovered in each of the pilot plasma flows so obtained increases from one group to the other, the interelectrode distances, hence the energy supplied to the common resulting flow, can be increased at the level of each group, whereby a flow of plasma can be obtained with an important section and under a considerable rate of delivery. Actually the geometry of the latter flow may be controlled by the proper positioning and orientation of each of the nozzle-electrode assemblies and the flow rate delivered by the same. The power supplied to the plasma increases very rapidly with the number of groups, starting from a pilot blowpipe of low energy.

Many other installations can be devised according to the invention. They will all be characterized by a very simple electrical current supply circuitry, each of these installations requiring at most one pilot generator of ionized gases. The plasma pilot blowpipe used in all the preceeding embodiments, whose electrical supply may be of any type (direct current, alternating current, under low or high frequencies) can be replaced by any other type of generator, such as a chemical combustion blowpipe whose flame may, if need be, be sowed with particles of an ionizing product, or by any other type of generator of ionized vapors or gaseous mixtures, or even by any short circuiting device coacting with the nozzles able to generate the ignition of arcs within the gaseous flows.

These installations offer many advantages. They permit the production of plasma streams within gaseous flows of any nature, including gases which are corrosive for metals at high temperatures, such as oxygen, especially in the case where the nozzles are connected to the positive terminal of a common supply generator G of direct current.

The operation of such an installation is practically independent of the respective flow rates delivered by each of the nozzles, so that laminar plasma streams may be obtained under rates as low as desired, the possible minimum rate being in all instances lower than the minimum rate under which a conventional plasma blowpipe may be supplied.

Figure 13:
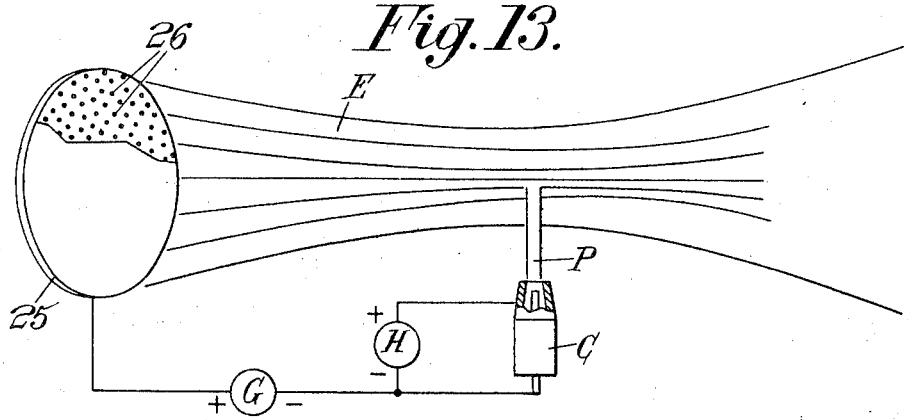

As already disclosed hereabove, these installations also permit the production of plasma flows having a very large volume. Such plasma flows having a large volume may also be obtained by an installation such as shown in FIG. 13, whose principle of operation is substantially similar to that of the installation of FIG. 1, wherein the nozzle has been replaced by a member 25 either porous or comprising a great number of apertures 26 enabling the delivery of a flow having an important volume, each of the said apertures then behaving like an individual nozzle.

In all installations, the nozzles or blowpipe may be moved with respect to one another in particular for stretching out the corresponding flows and for increasing in at least equal proportions the energy dissipated in these flows.

The form of the flow $E_0$ resulting from the convergence of the flows $E_1$, $E_2$ . . . may be acted upon by controlling the positioning of the pilot blowpipe and nozzles cooperating therewith or also by resorting to auxiliary gaseous flows not travelled by an electric current, yet able to act on its orientation in a predetermined direction.

It is also possible to substitute the gas in one at least of the flows after ignition therein of an electric arc, for another gas, for instance a gas which would not permit, as easily as the first one, a direct ingition of the arc therein, without interrupting the current flow.

More generally these installations exhibit in addition to the advantages set forth hereabove, the low cost of the operation, the low wear, if any, of the nozzles, the elimination of the required insulation in the conventional blowpipes of its different parts, since in the nozzles according to the invention all the parts thereof may be maintained at a same potential, their ability to operate under reduced or increased pressure, etc.

The installations according to the invention are particularly suitable for many uses, such as for instance:

The nozzles of the installation may be mounted in a furnace, for instance in its cover portion, and oriented respectively towards the interior space of the furnace, their operation being then initiated from a pilot generator of ionized gases mounted either fixedly or removably in a part of the furnace, for instance also in its cover;

The installations according to the invention are of particular interest for all the known applications of plasma flows such as: the welding, cutting, or melting of materials;

The treatment of powders (either of a refractory nature or not) by injecting the same within one or several plasma flows depending upon the desired duration of the presence of these powders therein, which duration can be in any case much greater than in the conventional systems;

The heating of gases, vapors or mixtures of any nature and under any pressure;

The performance of chemical reactions at high temperatures;

The plasmic propulsion authorized by the production of a very hot gaseous stream, under a high flow rate, and under high pressures which can reach several tens of bars or even more, etc.

What we claim is:

1. A process for producing a principal flow of hot gases which comprises producing at least one elementary flow of fluid by means of a first nozzle including an ejection channel and an electrode disposed substantially along the longitudinal axis of said ejection channel and having a front extremity which extends to a plane at least flush with respect to the end of said ejection channel, said elementary flow being caused to flow within said ejection channel around said electrode; causing said elementary flow to converge with at least one other fluid flow produced by a second nozzle so as to produce a principal flow resulting from the convergence of said elementary flow and said other fluid flow; connecting said electrode and said second nozzle in a normally open electrical circuit including an external voltage source which produces a voltage sufficient to cause completion of said circuit through said elementary flow and said other fluid flow when the electrical resistance therein is reduced; producing a plasma flow having a cross section greater than that of said elementary flow and said other fluid flow for ionizing the atmosphere in which said elementary flow and said other fluid flow are formed to thereby cause a reduction of the electrical resistance in, and an ionization of, said elementary flow and said other fluid flow; and maintaining the production of said plasma flow at least until up to the time when said electrical circuit is completed through the ionized elementary flow and other fluid flow.

2. A process according to claim 1 wherein a plasma flow having a section greater than that of said elementary flow and said other fluid flow is produced by means of a pilot plasma blow-pipe having a diverging anode.

3. A process according to claim 2 wherein the electrical supply of said blow-pipe is independent from the said electrical circuit.

4. A process according to claim 1 wherein said second nozzle is a plasma blow-pipe, said voltage source being connected to one of the electrodes of said plasma blow-pipe.

5. A process according to claim 2 which further comprises causing said plasma flow of greater section to flow through an annular member whose axis coincides substantially with that of said plasma blow-pipe, and which exhibits a conical surface flaring out towards the pilot blow-pipe for insuring the proper centering of said plasma flow of greater cross section.

6. A process for producing a principal flow of hot gases which comprises producing at least two elementary flows of fluid by means of a corresponding number of nozzles, each of which includes an ejection channel and an electrode disposed substantially along the longitudinal axis of said ejection channel and having a front extremity which extends at least to a plane flush with respect to the end of said ejection channel, said elementary flows being caused to flow within the ejection channels of the corresponding nozzles around their respective electrodes; causing said elementary flows to converge with one another so as to produce principal flow resulting from the convergence of said elementary flows; connecting the electrodes of said nozzles in a normally open electrical circuit including an external voltage source which provides a voltage sufficient to cause completion of said circuit through said elementary flows when the electrical resistance therein is reduced; producing a plasma flow having a section greater than that of said elementary flows for ionizing the atmosphere in which said elementary are formed to thereby cause a reduction of the electrical resistance in, and an ionization of, said elementary flows; and maintaining the production of said plasma flow at least until up to the time when said electrical circuit is completed through the ionized elementary flows.

7. A process according to claim 6 wherein said plasma flow having a section greater than that of said elementary flows is produced by means of a pilot plasma blow-pipe having a diverging anode.

8. A process according to claim 7 wherein the supply of said blow-pipe is independent from said electrical circuit.

9. A process according to claim 6 which comprises producing two elementary flows by means of two of said nozzles, said voltage source producing direct current and the positive and negative terminals thereof being respectively connected to the electrodes of the two nozzles.

10. A process according to claim 6 which comprises producing two elementary flows by means of two of said nozzles, said voltage source producing alternating current and the terminals thereof being respectively connected to the electrodes of the two nozzles.

11. A process according to claim 6 wherein said voltage source comprises a polyphase source having a number of phases equal to the number of said nozzles, each of said nozzles having the electrode associated therewith connected to a corresponding phase of said polyphase source.

12. A process according to claim 7 wherein said nozzles form several groups, the flows delivered by the nozzles of a same group converging substantially at a point on the axis of the plasma flow produced by said pilot blow-pipe, the points of convergence of the elementary flows produced by the nozzles of said different groups being located at different distances on said blow-pipe, and the electrodes of the nozzles in each of said groups being provided within an electrical circuit exclusively associated with that group and having a separate, individual external voltage source, said process further comprising successively causing completion of the normally opened circuit of each of said groups through their respective ionized elementary flows, starting from the group which is the closest to the pilot blow-pipe, and successively disconnecting the electrical supply of each of said sources starting from the group which is the closest to the pilot blow-pipe after the completion of the previously open electric circuit through the ionized elementary flows delivered by the nozzles of the next group.

13. A process according to claim 6 wherein the front extremity of each said electrode protrudes beyond the end of the ejection channel.

References Cited

UNITED STATES PATENTS

| | | | |
|---|---|---|---|
| 3,403,211 | 9/1968 | Foex | 219—121 PX |
| 3,205,338 | 9/1965 | Sunnen et al. | 219—121 P |
| 3,250,893 | 5/1966 | Nestor | 219—121 P |
| 3,450,926 | 6/1969 | Kierman | 219—121 PX |
| 3,375,392 | 3/1968 | Brzozowski et al. | 219—121 PX |
| 3,541,297 | 11/1970 | Sunnen et al. | 219—121 P |

JOSEPH V. TRUHE, Primary Examiner

G. R. PETERSON, Assistant Examiner

U.S. Cl. X.R.

219—74